(12) United States Patent
Beute et al.

(10) Patent No.: US 11,910,804 B2
(45) Date of Patent: Feb. 27, 2024

(54) COMPOSITION COMPRISING VEGETABLE OIL AND APPLE CIDER VINEGAR

(71) Applicant: Conopco Inc., Englewood Cliffs, NJ (US)

(72) Inventors: Marieke Beute, Vlaardingen (NL); Tjerk Bouman, Vlaardingen (NL); Alessia Ermacora, Vlaardingen (NL); Sabrina Silva Paes, Vlaardingen (NL); Jurek Woller, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 37 days.

(21) Appl. No.: 17/650,529

(22) Filed: Feb. 10, 2022

(65) Prior Publication Data
US 2022/0272996 A1    Sep. 1, 2022

Related U.S. Application Data

(63) Continuation of application No. 16/646,645, filed as application No. PCT/EP2018/073597 on Sep. 3, 2018, now Pat. No. 11,278,037.

(30) Foreign Application Priority Data

Sep. 22, 2017 (EP) .................................... 17192661

(51) Int. Cl.
*A23D 7/01* (2006.01)
*A23L 27/00* (2016.01)
(Continued)

(52) U.S. Cl.
CPC ............ *A23D 7/011* (2013.01); *A23D 7/0053* (2013.01); *A23L 3/3508* (2013.01); *A23L 27/60* (2016.08); *A23L 27/80* (2016.08); *A23L 29/238* (2016.08)

(58) Field of Classification Search
CPC ....... A23D 7/011; A23D 7/0053; A23L 27/80; A23L 27/60; A23L 29/238; A23L 3/3508
(Continued)

(56) References Cited

U.S. PATENT DOCUMENTS

| 2005/0123655 A1 | 6/2005 | Kobayashi et al. |
| 2006/0029703 A1 | 2/2006 | Almendarez et al. |

(Continued)

FOREIGN PATENT DOCUMENTS

| CL | 58948 | 6/2012 |
| CL | 201403463 | 12/2014 |

(Continued)

OTHER PUBLICATIONS

Jacqueline Pham; How to Make a Vinaigrette; Pham Fatale; 2013; 1 Page; XP55427248; http://www.phamfatale.com/id_3849/title_How-to-Make-a-Vinaigrette/; .; .

(Continued)

*Primary Examiner* — Brent T O'Hern
(74) *Attorney, Agent, or Firm* — N.V. Nederlandsch Octrooibureau

(57) ABSTRACT

An objective of the disclosure is to provide compositions containing vegetable oils and an anti-oxidant system to prevent oxidation of the triglycerides in the vegetable oil in food products, in particular in products which are often stored for a long time. The antioxidant system should not give an undesired colour, and neither an undesired taste, to a food composition. Additionally, it should be a natural compound and/or common food ingredient, and fitting to the food composition with regard to taste and colour. This has been achieved by providing a food composition containing vegetable oil and apple cider vinegar, wherein the weight ratio of citric acid and malic acid to total organic acids in the apple cider vinegar is more than 2%.

13 Claims, 1 Drawing Sheet

(51) Int. Cl.
  *A23L 27/60* (2016.01)
  *A23L 29/238* (2016.01)
  *A23D 7/005* (2006.01)
  *A23L 3/3508* (2006.01)

(58) Field of Classification Search
  USPC .......................................................... 426/532
  See application file for complete search history.

(56) References Cited

U.S. PATENT DOCUMENTS

| | | | |
|---|---|---|---|
| 2008/0181990 A1* | 7/2008 | Ledbetter | A23D 7/0053 426/601 |
| 2014/0205729 A1 | 7/2014 | Munafo et al. | |
| 2015/0181914 A1* | 7/2015 | Acharya | A23D 7/011 426/605 |
| 2015/0201658 A1 | 7/2015 | Steinberg | |
| 2017/0332654 A1 | 11/2017 | Everard | |

FOREIGN PATENT DOCUMENTS

| | | |
|---|---|---|
| CL | 60318 | 4/2016 |
| CL | 61987 | 4/2016 |
| CL | 62778 | 12/2017 |
| CL | 201703405 | 12/2017 |
| CL | 202000687 | 3/2020 |
| CL | 202000695 | 3/2020 |
| CN | 104116028 | 10/2014 |
| EP | 2101594 | 3/2014 |
| JP | 2002306119 | 10/2002 |
| JP | 2003235538 | 8/2003 |
| JP | 2004089006 | 3/2004 |
| JP | 3599821 | 12/2004 |
| JP | 2006246857 | 9/2006 |
| JP | 2011254707 | 12/2011 |
| JP | 2012060890 | 3/2012 |
| JP | 2017221143 | 12/2017 |
| JP | 2018050584 | 4/2018 |
| KR | 20020015804 | 3/2002 |
| KR | 20110119982 | 11/2011 |
| KR | 101125509 | 3/2012 |
| KR | 20120124089 | 11/2012 |
| PL | 227523 | 12/2017 |
| RU | 2213490 | 10/2003 |
| RU | 2433747 | 11/2011 |
| WO | WO0117495 | 3/2001 |
| WO | WO2005030234 | 4/2005 |
| WO | WO2008006597 | 1/2008 |
| WO | WO11064167 | 6/2011 |
| WO | WO2013189709 | 12/2013 |
| WO | WO14043053 | 3/2014 |
| WO | WO2016102167 | 6/2016 |
| WO | WO2016141164 | 9/2016 |
| WO | WO2018096092 | 5/2018 |

OTHER PUBLICATIONS

Plessi et al.; Quantitative Determination of Acids and Derivatives in Balsamic and Other Vinegars; Sciences Des Aliments; 1989; pp. 179-183; vol. 9, No. 1.

Zhishen et al.; The determination of flavonoid contents in mulberry and their scavenging effects on superoxide adicals; Food Chemistry; Jan. 1, 1999; 555-559, XP002782846; vol. 64.

Sanches-Salcedo et al.; (Poly)phenolic compounds and antioxidant activity of white (*Morus alba*) and black (*Morus nigra*) mulberry leaves: Their potential for new products rich in phytochemicals; Journal of Functional Foods; Mar. 26, 2015; 1039-1046 ; vol. 18.

Khan et al.; A comparative study on the antioxidant activity of methanolic extracts from different parts of *Morus alba* L. (Moraceae); BMC Research Notes; Jan. 1, 2013; 1-9; XP002782856; vol. 6 No. 24.

Lee Mi-Hyun et al.; Effect of Mulberry Powder on Quality Characteristics and Oxidative Stability of Mayonnaise prepared with Perilla Oil; The Korean Journal of Food and Nutrition; Dec. 31, 2014; 1132- 1140, XP053033153; vol. 27 No. 6.

Balsamico; Dallmayr; 2015; 1-3; XP055524141.

ANONYMOUS; Balsamic Apple Vinegar; Amazon.com; 2018; 1-2; XP055524714.

Gorji, Sara Ghorbani et al.; Lipid oxidation in mayonnaise and th role of natural antioxidants: A review; Trends in Food Science & Technology; Aug. 5, 2016; pp. 88-102; 56.

Nuria Calero et al.; Influence of chitosan concentration on the stability, microstructure and rheological properties of O/W emulsions formulated with high-oleic sunflower oil and potato protein; Food Hydrocolloids (2013); 152-162; 30 (1).

M. Pavlovic et al.; Oxidative stability of cold-pressed high oleic sunflower oils in bulk oils and emulsions; Physical Chemistry 2008; 415-417; 1; Society of Physical Chemists of Serbia, Belgrade, Serbia.

Jang-Hyuk Ahn et al. ; Antioxidant effect of natural plant extracts on the microencapsulated high oleic sunflower oil; Journal of Food Engineering 2007; 327-334; Elsevier Ltd.

A. Zainuddin et al.; Comparison of Oxidative Resistance of Traditional and High-Oleic Peanut Oils in Emulsions; Czech Journal of Food Sciences (2004); 2004; 136-139; 22.

Leidy Ricaurte et al.; Production of high-oleic palm oil nanoemulsions by high-shear homogenization (microfluidization); Innovative Food Science and Emerging Technologies; 2016; 75-85; 35; Elsevier LTD.

Poyato Candelaria et al.; Oxidative stability of O/W and W/O/W emulsions: Effect of lipid composition and antioxidant polarity; Food Research International; 2013; 132-140; 51(1).

Clitor Junior Fernandes De Souza et al.; Emulsions of Systems Containing Egg Yolk, Polysaccharides and Vegetable Oil; Ciencia e Agrotecnologia; 2012; 543-550; 36(5); Universidade Federal de Lavras.

Manuel Felix et al.; Viscoelastic properties, microstructure and stability of high-oleic O/W emulsions stabilised by crayfish protein concentrate and xanthan gum; Viscoelastic properties, microstructure and stability of high-oleic O/W emulsions stabilised by crayfish protein concentrate and xanthan gum; 2017; 9-17; 64.

Thaddao Waraho et al.; Impact of free fatty acid concentration and structure on lipid oxidation in oil-in-water emulsions; Food Chemistry; 2011; 854-859; 129 (3).

Young-Ju Lee et al.; Quality Characteristics of Salad Dressing Prepared with Mulberry Fruit Powder; Korean J. Food Cookery SCI; 2010; 537-544; 26 (5).

Analysis of total phenols and other oxidation substrates and antioxidants by means of Folin Ciocalteu reagent Methods in Ensymology ; 1999; 152-178; 299.

Particle & Particle Systems Characterization ; 1991.

Foodomics for mulberry fruit (*Morus spp.*)_ Analytical fingerprint as antioxidants' and health properties' determination tool— ScienceDirect; Mar. 2015; 179-188.

Dharmananda S; Fruit as Medicine; Morus Fruit; 2003; 2003; pp. 1-7.

Analysis of total Phenols and other Oxidation Substrates and Antioxidants by means of Folin Ciocalteu Reagent; 1999; 1-27.

Cocchi et al; Food Chemistry; Evolution of 5-(hydroxymethyl)furfural and furfural in the production chain of the aged vingegar Aceto Balsamico Tradizionale di Modena; Feb. 1, 2011; 822-832; 124 No. 3; Italy.

* cited by examiner

COMPOSITION COMPRISING VEGETABLE OIL AND APPLE CIDER VINEGAR

FIELD OF THE INVENTION

The present disclosure relates to a composition comprising vegetable oil and apple cider vinegar.

BACKGROUND TO THE INVENTION

Vegetable oil comprising mono-unsaturated or poly-unsaturated fatty acids in food products are prone to oxidation during storage of the food product. This causes rancidity, and may lead to rejection of the food product by consumers. Therefore food products often contain antioxidants to prevent oxidation of the vegetable oil, in particular food products which are stored for a relatively long time. An additive which may commonly be used is EDTA (ethylene-diamine-tetra-acetic acid), which complexes metal ions which generally promote oxidation of the triglycerides in the vegetable oil. These metal ions may be present in the food product as constituent of common food ingredients. EDTA however can be regarded to be chemical and artificial by consumers, therefore there is a need for alternatives which are natural. Within the food industry an increasing effort is made to remove artificial ingredients from food products and to replace them with natural alternatives. Owing to its effectiveness, reasonable cost, and lack of viable alternatives, however, EDTA has so far been one of the more difficult artificial ingredients to replace. Many compounds are known for their antioxidative properties, however not all compounds are sufficiently effective.

WO 2013/189709 A1 relates to mayonnaise which does not contain EDTA, and which contains reduced grape juice. Additionally, the mayonnaise contains a source of acetic acid, which is selected from the group of wine vinegar, sherry vinegar, spirit vinegar, rice vinegar, apple vinegar, malt vinegar and combinations thereof. Reduced oxidation of the oil is caused by the incorporation of the reduced grape juice.

WO 2017/001154 A1 discloses compositions containing caramel and phenolic compounds.

WO 2007/096444 A1 discloses a mayonnaise-type sauce, the composition of which includes only buttermilk by way of an emulsifier, and may also contain white wine vinegar.

EP 1 336 340 A1 discloses a mayonnaise sauce and its manufacturing process, said mayonnaise having extra virgin olive oil as its main oily ingredient and olive oil as its secondary oily ingredient.

JP2004073043 A2 discloses a dressing which contains 'umeboshi vinegar'. The umeboshi vinegar has the effect that it contains acids which have antibacterial properties. Umeboshi vinegar is a salty and sour condiment, which is the byproduct from making umeboshi. Umeboshi are pickled and dried plums, from the species *Prunus mume*.

D. Tagliazucchi et al. (European Food Research and Technology, 227(3), 2008, p. 835-843) describes the antioxidant activity of traditional balsamic vinegar, due to compounds synthesized during cooking of must.

CN 101708062 relates to the use of modified tea polyphenols in fatty foods, to improve antioxidant activity.

SUMMARY OF THE INVENTION

Generally, an anti-oxidant is required to prevent oxidation of the triglycerides in vegetable oil in food products, in particular in products which are often stored for a long time. Consumers are more and more interested in food products which are free from ingredients which are perceived to be chemical or artificial. Hence, one of the objectives of the disclosure is to provide an antioxidant system which can be regarded to be a natural or known ingredient, and is not considered to be an artificial chemical by the consumer. Another objective of the disclosure is to provide food products containing vegetable oil containing such antioxidant system, and which are free or nearly free from EDTA. Moreover, oxidation of the triglycerides in the vegetable oil in such food products during storage should nevertheless be as low as possible, therefore it is another objective of the disclosure to provide food products having that property. The food product may contain an antioxidant system, and such system should not negatively influence the food products. Moreover the colour and taste profile of the antioxidant system should fit to the food product in which it is used. For example, the antioxidant system should not give a dark colour to a light coloured food product, as the food product would become too dark. Moreover, the taste profile should fit to the food product in which it is used.

Therefore it is an objective of the disclosure to provide an antioxidant system that does not give an undesired colour, and neither an undesired taste, to a food composition. Additionally, it should be a natural compound and/or common food ingredient, and fitting to the food composition with regard to taste and colour. More in particular it is an objective of the disclosure to provide an oil-in-water emulsion like a mayonnaise or a salad dressing which is free or nearly free from EDTA, and that contains an antioxidant system that does not give an undesired colour and taste to the emulsion, and that is regarded to be a natural ingredient by the consumer.

We have found a solution to these problems by providing a food composition containing vegetable oil, wherein the composition comprises apple cider vinegar, amino acids, and one or more phenolic compounds. More in particular the apple cider vinegar comprises citric acid and malic acid, and the weight ratio of citric acid and malic acid to total organic acids in the vinegar is more than 2%.

Accordingly, in a first aspect the disclosure provides a composition comprising water and vegetable oil, the vegetable oil comprising mono-unsaturated and/or poly-unsaturated fatty acids;

wherein the concentration of the vegetable oil ranges from 5% to 85% by weight of the composition; wherein the composition has a pH ranging from 2.5 to 5;

wherein the composition further comprises apple cider vinegar, wherein the apple cider vinegar comprises citric acid and malic acid, and wherein the weight ratio of citric acid and malic acid to total organic acids in the vinegar is more than 2%.

In a second aspect the disclosure provides use of apple cider vinegar, wherein the apple cider vinegar comprises citric acid and malic acid, and wherein the weight ratio of citric acid and malic acid to total organic acids in the vinegar is more than 2%, in a composition comprising water and vegetable oil, the vegetable oil comprising mono-unsaturated and/or poly-unsaturated fatty acids;

wherein the concentration of the vegetable oil ranges from 5% to 85% by weight of the composition, in order to reduce oxidation of the mono-unsaturated and/or poly-unsaturated fatty acids.

DETAILED DESCRIPTION OF THE INVENTION

All percentages, unless otherwise stated, refer to the percentage by weight (wt %).

"Weight ratio" means that the concentration of a first (class of) compound(s) is divided by the concentration of a second (class of) compound(s), and multiplied by 100 in order to arrive at a percentage.

"Spoonable" means that a composition is semi-solid but not free-flowing on a time scale typical for eating a meal, meaning not free-flowing within a time period of an hour. A sample of such substance is able to be dipped with a spoon from a container containing the composition.

Except in the operating and comparative examples, or where otherwise explicitly indicated, all numbers in this description indicating amounts or ratios of material or conditions of reaction, physical properties of materials and/or use are to be understood as modified by the word "about".

The disclosure provides a composition as defined in the first aspect above. The term "oil" as used herein refers to lipids selected from triglycerides, diglycerides, monoglycerides and combinations thereof. Preferably the oil in the context of this disclosure comprises at least 90 wt % of triglycerides, more preferably at least 95 wt %. Preferably the oil contains less than 20 wt % of solid oil at 5° C., preferably less than 10 wt % solid oil. More preferred the oil is free from solid oil at 5° C. Most preferred the oil is liquid at 5° C. Preferred oils for use in the context of this disclosure are vegetable oils which are liquid at 5° C. Preferably the oil comprises sunflower oil, rapeseed oil, olive oil, soybean oil, and combinations of these oils. Therefore preferably the vegetable oil is an edible oil. The mono-unsaturated fatty acids as comprised in the oil preferably comprise oleic acid. The poly-unsaturated fatty acids as comprised in the oil preferably comprise linoleic acid and linolenic acid. Preferably the amount of extra virgin olive oil in the composition of the disclosure is maximally 40% by weight of the composition. More preferably the amount of extra virgin olive oil in the composition of the disclosure is maximally 20% by weight of the composition, more preferred maximally 15% by weight. Preferably the amount of olive oil in the composition of the disclosure is maximally 20% by weight of the composition, more preferred maximally 15% by weight more preferred maximally 10% by weight.

Preferably the concentration of oil ranges from 10% to 75% by weight of the composition. Preferably the amount of oil is at least 20% by weight, preferably at least 25% by weight. Preferably the concentration of vegetable oil is maximally 70% by weight, preferably maximally 60% by weight, preferably maximally 45%. Any combination of ranges using these mentioned end points are considered to be part of the disclosure as well.

The composition of the disclosure preferably is in the form of an oil-in-water emulsion, preferably is a mayonnaise, or a salad dressing, or a vinaigrette. Preferably the composition is an edible emulsion. Examples of oil-in-water emulsions encompassed by the disclosure include mayonnaise, dressings, salad dressings, vinaigrettes and emulsified sauces. Preferably, the oil-in-water emulsion is a mayonnaise, or a dressing or a salad dressing or a vinaigrette, most preferably a mayonnaise or a salad dressing or a vinaigrette. Generally a mayonnaise is spoonable, while a salad dressing or a vinaigrette is pourable. A vinaigrette traditionally is a mixture of vegetable oil and a vinegar, and may be a stable oil-in-water emulsion or may be an unstable oil-in-water emulsion that separates into its oil- and aqueous phase. A vinaigrette traditionally can be used as a salad dressing, but also as a marinade.

In the context of the disclosure, the preferred oil-in-water emulsion may be stable as an emulsion during a time period of for example less than one hour (like for example some vinaigrettes), or even during a time period of half a year or more (like for example some mayonnaises).

Mayonnaise is generally known as a thick, creamy sauce that can be used as a condiment with other foods. Mayonnaise is a stable water-continuous emulsion of typically vegetable oil, egg yolk and either vinegar or lemon juice. In many countries the term mayonnaise may only be used in case the emulsion conforms to the "standard of identity", which defines the composition of a mayonnaise. For example, the standard of identity may define a minimum oil level, and a minimum egg yolk amount. Also mayonnaise-like products having oil levels lower than defined in a standard of identity or not containing egg yolk can be considered to be mayonnaises. These kind of products may contain thickeners like starch to stabilise the aqueous phase. Mayonnaises may vary in colour, and are generally white, cream-coloured, or pale yellow. The texture may range from of light creamy to thick, and generally mayonnaise is spoonable. In the context of the disclosure "mayonnaise" includes emulsions with vegetable oil levels ranging from 5% to 85% by weight of the product. Mayonnaises in the context of the disclosure do not necessarily need to conform to a standard of identity in any country.

Preferably the composition of the disclosure comprises an oil-in-water emulsifier. The emulsifier serves to disperse oil droplets in the continuous aqueous phase. Preferably the emulsifier comprises an oil-in-water emulsifier originating from egg, preferably from egg yolk. Preferably the composition comprises egg yolk as an ingredient which also provides the water-in-oil emulsifier. The presence of egg yolk may be beneficial for taste, emulsification and/or stability of the oil droplets in the composition of the disclosure. Egg yolk contains phospholipids, which act as emulsifier for the oil droplets. Preferably the concentration of egg yolk in the composition of the disclosure ranges from 1% to 8% by weight of the emulsion, more preferred from 2% to 6% by weight of the emulsion. The egg yolk may be added as egg yolk component, meaning largely without egg white. Alternatively, the composition may also contain whole egg, containing both egg white and egg yolk. The total amount of egg yolk in the composition of the disclosure includes egg yolk that may be present as part of whole egg. Preferably the concentration of phospholipids originating from egg yolk ranges from 0.05% to 1% by weight, preferably from 0.1% to 0.8% by weight of the preferred oil-in-water emulsion.

Alternatively, the composition of the disclosure comprises an oil-in-water emulsifier that does not originate from egg or egg yolk. Preferably such oil-in-water emulsifier is from plant or botanical origin, and may be used native or modified. This way a vegan oil-in-water emulsifier can be created without ingredients from animal origin. Preferably the oil-in-water emulsifier comprises starch sodium octenyl succinate (European food additive E1450). This emulsifier is available commercially as for example N-creamer 46, ex Ingredion Inc. (Westchester, IL, USA). Other preferred emulsifiers from botanical origin are legume proteins.

The composition of the disclosure has a pH ranging from 2.5 to 5, preferably ranging from 2.5 to 4. The acids in the composition originate from the apple cider vinegar. Additionally, the composition may contain other sources of organic acid. Preferably the concentration of the apple cider vinegar ranges from 0.5% to 20% by weight. More preferred the concentration of the apple cider vinegar ranges from 3% to 18% by weight, more preferred from 5% to 15% by weight.

The total amount of acid in the composition can be determined by titration with sodium hydroxide (NaOH), and expressed as titratable acidity. This is called the titratable acidity, expressed as acetic acid (HAc), which is determined using the following formula.

$$HAc\ \% = 100\% - (V \cdot t \cdot M)/m \tag{1}$$

wherein:
V: volume NaOH solution added (mL)
t: concentration NaOH solution (mol/L)
M: molecular weight HAc (60.052 g/mol)
m: mass (g) product which has been titrated Preferably the composition of the disclosure has a total titratable acidity ranging from 0.03% to 3% by weight expressed as acetic acid, preferably from 0.05% to 2% by weight, preferably from 0.1% to 1% by weight. Preferably, the composition comprises one or more organic acids other than acetic acid at a concentration ranging from 0.002% to 0.12% by weight of the composition. These organic acids generally originate from the apple cider vinegar, nevertheless other ingredients of the composition may contribute organic acids to the composition as well. Preferably the composition comprises one or more organic acids other than acetic acid at a concentration ranging from 0.01% to 0.09% by weight of the composition, more preferred from 0.02% to 0.085% by weight, more preferred from 0.03% to 0.08% by weight, and most preferred from 0.04% to 0.08% by weight. The composition contains citric acid and malic acid, originating from the apple cider vinegar. The acids as described in this specification include their corresponding salts which are in equilibrium with the acids (acetates, citrates, malates, lactates, succinates, etc.). In case a concentration of an acid is provided, then this concentration refers to total concentration of the acid and its corresponding salt.

Preferably, the weight ratio of one or more organic acids other than acetic acid to total organic acids in the composition ranges from 2% to 60% w/w. Preferably the weight ratio between citric acid and malic acid to total organic acids in the composition ranges from 4% to 25%, more preferred from 4.8% to 17%, more preferred from 5% to 15%. Preferably the composition contains acetic acid and malic acid in a weight ratio in the range of 2:1 to 12:1.

The composition of the disclosure preferably comprises one or more amino acids at a concentration ranging from 0.0005% to 0.05% by weight of the composition. At least part of these amino acids are present in the apple cider vinegar, before mixing that source with the other ingredients of the composition of the disclosure. In addition, they may also be added to the composition independently from the apple cider vinegar. Preferably the composition comprises one or more amino acids at a concentration ranging from 0.0007% to 0.03% by weight of the composition, more preferred from 0.002% to 0.025% by weight, more preferred from 0.005% to 0.025% by weight, more preferred from 0.008% to 0.022% by weight, and most preferred from 0.01% to 0.02% by weight. In the context of the disclosure, "amino acids" refers to "free amino acids", meaning amino acids not bound in a protein or a peptide. Preferred amino acids comprise alanine, asparagine, aspartic acid, proline, glutamic acid, leucine, isoleucine, valine, and glycine. The term "amino acid" may refer to an amino acid and its corresponding salts, which may be in equilibrium with the amino acid.

The composition of the disclosure preferably comprises one or more phenolic compounds at a concentration ranging from 0.0005% to 0.04% by weight expressed as gallic acid equivalents. Preferably these phenolic compounds are naturally present in the apple cider vinegar, but they may also be added to the composition independently from the apple cider vinegar. Preferably the composition comprises one or more free phenolic compounds at a concentration ranging from 0.0006% to 0.03% by weight GAE, more preferred from 0.001% to 0.025% by weight GAE, more preferred from 0.003% to 0.022% by weight GAE, more preferred from 0.01% to 0.02% by weight GAE, and most preferred from 0.011% to 0.019% by weight GAE.

A common method to determine the phenolic compounds concentration of a sample, is the concentration in "gallic acid equivalents" (GAE). Whenever reference is made herein to "gallic acid equivalents" what is meant is the amount of gallic acid equivalents as determined by the Folin-Ciocalteu assay. Gallic acid (3,4,5-trihydroxybenzoic acid) is the phenolic acid that is used as a standard for determining the phenol content of various analyses by the Folin-Ciocalteu assay (see V. L. Singleton et al., Analysis of total phenols and other oxidation substrates and antioxidants by means of Folin-Ciocalteu reagent, Methods in Enzymology 299, 152-178, 1999).

Preferably, the composition comprises mustard seed bran, preferably at a concentration ranging from 0.05% to 4% by weight of the composition, preferably ranging from 0.075% to 2.75% by weight, more preferred from 0.1% to 2% by weight. The mustard seed preferably comprises yellow or oriental mustard seed. The mustard bran is obtained from the whole mustard seeds. Preferably the mustard bran is treated by dispersing in water and heating for preferably 10 minutes at 90° C. in order to make it suitable to be incorporated into the composition of the disclosure. After this heat treatment the dispersion is cooled, and mixed with the aqueous phase of the emulsion, before the aqueous phase is mixed with the oil for emulsification. The advantage of the mustard bran is that the oxidation of the vegetable oil is even stronger reduced than using the apple cider vinegar only. Additionally, the mustard bran provides structure to the composition, as it acts as a binder or thickener for the water in the composition. Also fractions of mustard bran may be incorporated into the compositions of the disclosure. Preferably yellow mustard bran mucilage is incorporated into the composition at a concentration ranging from 0.05% to 4% by weight of the composition, preferably ranging from 0.075% to 2.75% by weight, more preferred from 0.1% to 2% by weight.

Preferably the composition does not contain other hydrocolloids. Nevertheless, instead of using mustard bran, or in addition to mustard bran, the composition may contain one or more hydrocolloids. In case a hydrocolloid is used, then preferably the composition comprises guar gum, preferably at a concentration ranging from 0.01% to 0.3% by weight of the composition. The guar gum is advantageous to stabilise the composition, and to give it the correct consistency. Other gums or hydrocolloids may be used instead of guar gum, or in addition to guar gum.

The composition of the disclosure preferably comprises one or more monosaccharides and/or disaccharides. Preferred one or more monosaccharides and/or disaccharides include fructose, glucose, and sucrose. The concentration of one or more monosaccharides and/or disaccharides in the composition preferably ranges from 0.5% to 6% by weight, more preferred from 1% to 5% by weight. The monosaccharides and/or disaccharides preferably at least partly originate from the apple cider vinegar. Additionally, monosaccharides and/or disaccharides may be added to the composition as a constituent of other ingredients of the composition, or in pure form.

The advantage of the composition of the disclosure is that the oxidation of the vegetable oil is strongly reduced as compared to compositions without the apple cider vinegar as defined herein. Therefore the amount of EDTA which commonly is present in compositions containing vegetable oil can be strongly reduced. This way a food composition is presented to the consumer, which does not contain compounds which are often regarded to be chemical or artificial by that consumer. Hence, preferably the composition comprises EDTA at a concentration lower than 0.007% by weight, preferably lower than 0.005% by weight, preferably lower than 0.002% by weight, preferably lower than 0.001% by weight of the composition. Most preferred EDTA is absent from the composition.

The composition of the disclosure preferably contains additionally other ingredients than already specifically mentioned in here. Preferably the composition contains plant material in the form of herbs and/or spices. In case such ingredients are present in the composition, then generally their total concentration is at least 0.1% by weight, and preferably maximally 10% by weight, preferably maximally 5% by weight.

Apple Cider Vinegar

The apple cider vinegar which is comprised in the composition of the disclosure is essential in order to achieve the benefit of the reduced oxidation of the vegetable oil.

Preferably the apple cider vinegar as defined herein, comprises balsamic apple cider vinegar. A particular preferred apple cider vinegar is balsamic apple cider vinegar, for example as supplied by Vinagrerias Riojanas (Logroño, La Rioja, Spain). This means that the apple cider vinegar is prepared from apple must. The vinegar additionally may provide taste, flavour, and odour to the composition of the disclosure. The dry matter content of the apple cider vinegar preferably is more than 15% by weight, preferably ranges from 20% to 50% by weight of the source of organic acid. Additionally the apple cider vinegar may be supplemented with one or more pure organic acids, or with spirit vinegar.

Preferably, the total acidity of the apple cider vinegar ranges from 2% to 20% by weight, preferably from 4% to 14% by weight, expressed as acetic acid. More preferred the total acidity of the apple cider vinegar from 4% to 10% by weight, expressed as acetic acid. As the vinegar contains citric acid and malic acid, the composition of the disclosure comprises one or more organic acids other than acetic acid. Preferably the weight ratio between organic acid other than acetic acid to total organic acids in the apple cider vinegar ranges from 2% to 30%. Preferably, the weight ratio of one or more organic acids other than acetic acid to total organic acids in the apple cider vinegar ranges from 4% to 25%, more preferred from 5% to 20%, and most preferred from 6% to 13%. The apple cider vinegar contains citric acid and malic acid, at a weight ratio to total organic acids in the vinegar of more than 2%. Preferably the weight ratio between citric acid and malic acid to total organic acids in the apple cider vinegar ranges from 2% to 25%, more preferred from 4% to 17%, more preferred from 5% to 15%, and most preferred from 5.5% to 10%. Preferably the apple cider vinegar contains acetic acid and malic acid in a weight ratio ranging from 2:1 to 12:1. Preferably the apple cider vinegar comprises citric acid at an amount of maximally 20% by weight of the total amount of organic acids in the apple cider vinegar.

Preferably, the apple cider vinegar comprises one or more amino acids, preferably the weight ratio between one or more amino acids and total organic acids in the apple cider vinegar ranges from 0.5% to 10%. Preferably the weight ratio of amino acids to total organic acids in the apple cider vinegar ranges from 0.7% to 9%, more preferred from 1% to 8%, and most preferred from 1.5% to 5%. A preferred amino acid present in the apple cider vinegar is asparagine. Preferably the weight ratio of asparagine to total organic acids in the apple cider vinegar ranges from 0.2% to 10%, more preferred from 1% to 5%.

The apple cider vinegar preferably contains saccharides, in particular one or more monosaccharides and/or disaccharides. Preferably the apple cider vinegar comprises one or more monosaccharides and/or disaccharides at a concentration ranging from 10% to 30% by weight, more preferred from 12% to 28% by weight.

Method for Preparation of Composition

The compositions of the disclosure are prepared by any method commonly known for preparing oil-in-water emulsions. Preferably using such method an oil-in-water emulsion is prepared, wherein the oil droplets have a surface weighted mean diameter $D_{3,2}$ of less than 10 micrometer (see M. Alderliesten, Particle & Particle Systems Characterization 8 (1991) 237-241; for definitions of average diameters).

Use of Apple Cider Vinegar

In a second aspect the disclosure provides use of apple cider vinegar, wherein the apple cider vinegar comprises citric acid and malic acid, and wherein the weight ratio of citric acid and malic acid to total organic acids in the vinegar is more than 2%, in a composition comprising water and vegetable oil, the vegetable oil comprising mono-unsaturated and/or poly-unsaturated fatty acids;

wherein the concentration of the vegetable oil ranges from 5% to 85% by weight of the composition, in order to reduce oxidation of the mono-unsaturated and/or poly-unsaturated fatty acids.

The disclosure also provides a method for reduction of oxidation of mono-unsaturated and/or poly-unsaturated fatty acids, by using apple cider vinegar, wherein the apple cider vinegar comprises citric acid and malic acid, and wherein the weight ratio of citric acid and malic acid to total organic acids in the vinegar is more than 2% by weight, in a composition comprising water and vegetable oil, the vegetable oil comprising mono-unsaturated and/or poly-unsaturated fatty acids;

wherein the concentration of the vegetable oil ranges from 5% to 85% by weight of the composition.

EXAMPLES

Figure 1:
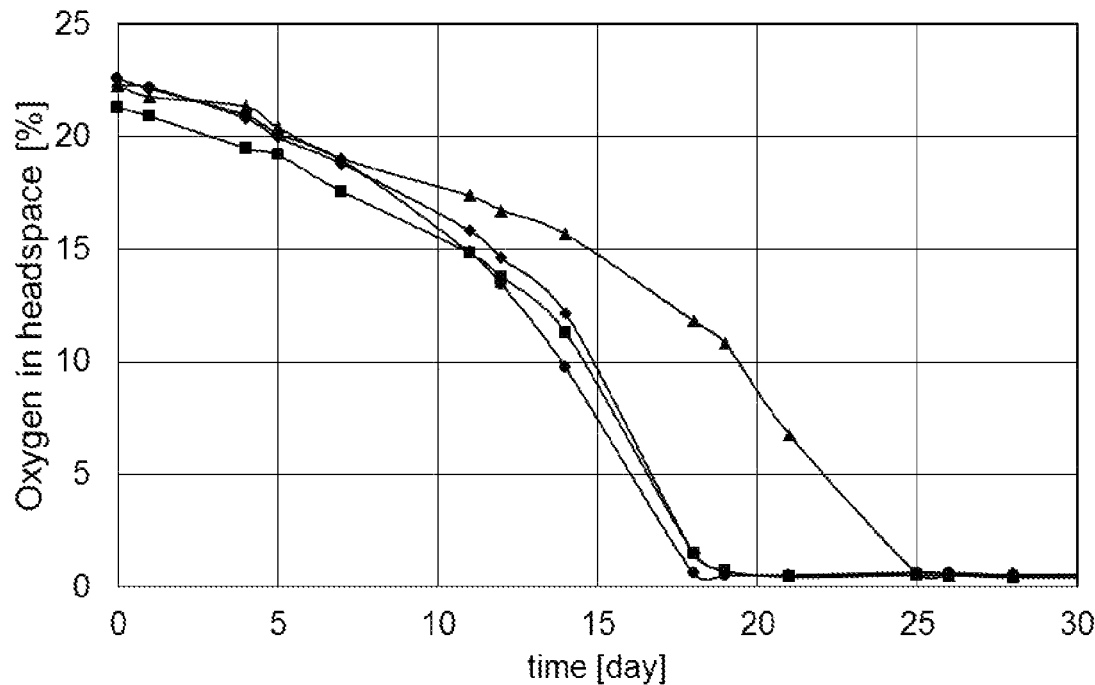
FIG. 1: Oxygen concentration in headspace during storage trial of mayonnaises at 50° C., from example 1; legend:
●: mayonnaise #14 (spirit vinegar)
■: mayonnaise #12 (apple cider vinegar 2)
♦: mayonnaise #13 (apple cider vinegar 3)
▲: mayonnaise #11 (apple cider vinegar 1)

The disclosure is illustrated with the following non-limiting examples.

Raw Materials

Water: demineralised water.
Rapeseed oil ex Cargill (Amsterdam, The Netherlands).

Sugar: sucrose white sugar W4 ex Suiker Unie (Oud Gastel, Netherlands).
Salt: NaCl suprasel ex Akzo Nobel (Amersfoort, Netherlands).
EDTA: Ethylenediaminetetraacetic acid, calcium disodium complex, dehydrate; Dissolvine E-CA-10 ex Akzo Nobel (Amersfoort, Netherlands).
Egg yolk: ex Bouwhuis Enthoven (Raalte, the Netherlands); contains 92% egg yolk and 8% kitchen salt.
Guar gum: ex Willy Benecke GmbH (Hamburg, Germany).
Vinegar spirit 12% ex Kuhne (Hamburg, Germany)
Apple cider vinegar 1: Balsamic apple vinegar ex Vinagrerias Riojanas (Logroño, La Rioja, Spain).
Apple cider vinegar 2: Amora Cider Vinegar ex Unilever France (Paris, France).
Apple cider vinegar 3: Apple cider vinegar 10090 ex Wijnimport Van der Steen BV, Vught, the Netherlands.
Acetic acid solution 50%: Prepared in house, consisting of a 50:50 v/v % solution of acetic acid glacial (VWR, Amsterdam, the Netherlands) and demineralised water.

Methods—Accelerated Shelf-Life Test to Follow Lipid Oxidation.

Vegetable oil is subjected to conditions which promote oxidation, without requiring the typical shelf life of 4 to 9 months of mayonnaise. Oxidation experiments are carried out during a period up to generally about 30 days, in some experiments up to 80 days, to follow the oxidation of the vegetable oil in oil-in-water emulsions.

Emulsion samples with various compositions are prepared (as described in the examples below) and 1 g of each sample is filled in a capped glass vial (20 mL volume) and kept in a temperature controlled oven at 50° C.

The oxidation of triglycerides occurs in several steps, in which the first step is the most important. This first step is the lag phase, which is the phase where there is not much oxidation, and after this phase the oxidation starts to accelerate. This means that the amount of oxidation products rapidly starts to increase. The longer the lag phase, the slower the oxidation process, and the better the result.

Oxygen Concentration in Headspace

To follow oxidation of fatty acids in emulsions in the experiments, the oxygen concentration is measured in the headspace of closed jars in which emulsions are stored to follow oxidation. The lower this concentration, the more oxygen is consumed for oxidation processes. The oxygen content is determined by taking a sample of gas from the headspace with a needle through a septum in the closed lid of the jar. The oxygen concentration in the sample is determined by gas analyser.

Methods—Organic Acids and Free Amino Acids

Quantitative analysis of organic acids and free amino acids in various sources of organic acids was carried out spectroscopically ($^1$H-NMR).

200 mg of sample (vinegar) was weighed and added with 3 ml of $D_2O$. 600 µl of such sample mixture was added with 100 µl of CSI (Chemical Shift Indicator) solution (consisting of 10.90 mg of 3-(trimethylsilyl)propionic-2,2,3,3-$d_4$ acid, sodium salt, 2.30 mg of difluorotrimethyl-silanyl-methyl) phosphonic acid and 30 ml of $D_2O$), 100 µl of EDTA-$d_{12}$ solution, and 300 µl of 0.2 M phosphate buffer. The sample mixture was homogenised and centrifuged at 15000 g for 10 minutes. 650 µl of the supernatant was transferred into 5-mm NMR tubes for analysis.

1D $^1$H NMR spectra were recorded with a noesygppr1d pulse sequence on a Bruker Avance III 600 NMR spectrometer, equipped with a 5-mm cryo-probe. The probe was tuned to detect $^1$H resonances at 600.25 MHz. The internal probe temperature was set to 298K. 128 scans were collected in 57K data points with a relaxation delay of 10 seconds, an acquisition time of 4 seconds and a mixing time of 100 ms. Low power water suppression (16 Hz) was applied for 0.99 seconds. The data were processed in Topspin software version 3.5 pl 1 (Bruker BioSpin GmbH, Rheinstetten, Germany). An exponential window function was applied to the free induction decay (FID) with a line-broadening factor of 0.15 Hz prior to the Fourier transformation. Manual phase correction and baseline correction was applied to all spectra. The spectra were referenced against the methyl signal of 3-(trimethylsilyl)propionic-2,2,3,3-$d_4$ acid, sodium salt (δ 0.0 ppm).

Methods—Phenolic Compounds

The concentration of phenolic compounds is expressed as "gallic acid equivalents" (GAE), and determined using the Folin-Ciocalteu assay (see V. L. Singleton et al., Analysis of total phenols and other oxidation substrates and antioxidants by means of Folin-Ciocalteu reagent, Methods in Enzymology 299, 152-178, 1999).

Example 1—Mayonnaises Containing Different Apple Cider Vinegars

Mayonnaises were prepared according to the following recipes, containing various types of apple cider vinegar or spirit vinegar. Additionally, acetic acid solution was added, so that the compositions had the same pH (3.8).

TABLE 1

Compositions of mayonnaises containing different apple cider vinegars.

| | Concentration [wt %] | | | |
|---|---|---|---|---|
| Ingredient | #11 | #12 | #13 | #14 |
| Water | 14.62 | 14.64 | 14.65 | 15.05 |
| Oil (rapeseed) | 75 | 75 | 75 | 75 |
| Sugar | 1.3 | 1.3 | 1.3 | 1.3 |
| Salt | 1.2 | 1.2 | 1.2 | 1.2 |
| Egg yolk | 4.2 | 4.2 | 4.2 | 4.2 |
| Flavours | 0.2 | 0.2 | 0.2 | 0.2 |
| Apple cider vinegar 1 | 3 | 0 | 0 | 0 |
| Apple cider vinegar 2 | 0 | 3 | 0 | 0 |
| Apple cider vinegar 3 | 0 | 0 | 3 | 0 |
| Spirit vinegar | 0 | 0 | 0 | 3 |
| Acetic acid solution (50% w/w) | 0.44 | 0.42 | 0.41 | 0.01 |

The mayonnaises were prepared at bench scale (0.25 kg emulsion), following a 2-step procedure. In the first step, the mayonnaise aqueous phase was prepared by mixing water, egg, sucrose and salt in an Esco-Labor processing plant type EL0 (Riehen, Switzerland). Subsequently the oil was slowly added to the aqueous phase, under stirring conditions. After the oil had been homogenised into a coarse emulsion, the latter was pumped into a Labor-Pilot 2000/4 colloid mill (IKA Labor, Staufen, Germany), equipped with module MK. The speed of the colloid mill was set to 6000 rpm. In the second step, the fine emulsion obtained as just described was divided into a number of aliquots of 250 g and each aliquot was added with a specific vinegar (according to formulation) and homogenised with a hand mixer. The compositions had a pH of 3.8.

These mayonnaises and vinegars were analysed for the attributes in the following two tables. The vinegars are specified by a number of parameters as defined in claim 1 (a.o. ratios of acids). The mayonnaises are defined by the concentration of a number of compounds in the composition, in order to characterize these compositions to achieve the required effects.

TABLE 2

Analytical parameters of combination of vinegars and acetic acid solution used in mayonnaises from Table 1.

| Sample | Ratio organic acids other than acetic acid to total organic acids [%] | Ratio amino acids to total organic acids [%] | Absorbance at 420 nm [—] |
|---|---|---|---|
| Apple cider vinegar 1 + acetic acid solution | 6.55 | 1.77 | 0.49 |
| Apple cider vinegar 2 + acetic acid solution | 0.64 | 0.018 | 0.21 |
| Apple cider vinegar 3 + acetic acid solution | 0.88 | 0.045 | 0.06 |
| Spirit vinegar + acetic acid solution | 0.005 | 0.000 | 0.03 |

TABLE 3

Analytical parameter of apple cider vinegars used in mayonnaises from Table 1.

| Sample | Ratio citric acid and malic acid to total organic acids [wt %] |
|---|---|
| Apple cider vinegar 1 | 6.12 |
| Apple cider vinegar 2 | 0.00 |
| Apple cider vinegar 3 | 0.00 |
| Spirit vinegar | 0.00 |

TABLE 4

Analytical parameters of mayonnaises from Table 1.

| Sample | Organic acids other than acetic acid [wt %] | Amino acids [wt %] | Phenolic compounds [GAE %] |
|---|---|---|---|
| Mayonnaise #11 | 0.023 | 0.0061 | 0.0046 |
| Mayonnaise #12 | 0.0021 | 0.00006 | 0.0021 |
| Mayonnaise #13 | 0.0029 | 0.00015 | 0.0012 |
| Mayonnaise #14 | 0.00003 | 0.00000 | 0.00004 |

Oxygen concentration in headspace during storage trial of mayonnaises at 50° C. was determined, to see the influence of the type of vinegar (see FIG. 1). Mayonnaise #14 (●, containing spirit vinegar) shows the most rapid decrease of oxygen concentration in the headspace, indicating that oxidation of oil is most rapid in this mayonnaise. The mayonnaise #11 with apple cider vinegar 1 (▲) shows the slowest decrease of oxygen concentration.

The mayonnaise containing the apple cider vinegar 1 conforming to the requirements as specified herein for the composition as well as the apple cider vinegar, shows a slower oxidation than the mayonnaises containing spirit vinegar or the other apple cider vinegars. This shows that not just any apple cider vinegar provides the required benefits, but that only apple cider vinegar conforming to the requirements as defined herein lead to the required result.

Example 2—Mayonnaises Containing Apple Cider Vinegar at Different Concentrations Mayonnaises were prepared according to the following recipes, containing apple cider vinegar 1 and acetic acid solution at different concentrations. The acetic acid solution was added, so that the compositions had the same pH (3.8).

TABLE 5

Compositions of mayonnaises containing apple cider vinegar 1 at different concentrations.

| | Concentration [wt %] | | | | |
|---|---|---|---|---|---|
| Ingredient | #21 | #22 | #23 | #24 | #25 |
| Water | 14.62 | 15.53 | 16.43 | 16.89 | 17.34 |
| Oil (rapeseed) | 75 | 75 | 75 | 75 | 75 |
| Sugar | 1.3 | 1.3 | 1.3 | 1.3 | 1.3 |
| Salt | 1.2 | 1.2 | 1.2 | 1.2 | 1.2 |
| Egg yolk | 4.2 | 4.2 | 4.2 | 4.2 | 4.2 |
| Flavours | 0.2 | 0.2 | 0.2 | 0.2 | 0.2 |
| Apple cider vinegar 1 | 3 | 2 | 1 | 0.5 | 0 |
| Acetic acid solution (50% w/w) | 0.44 | 0.53 | 0.63 | 0.67 | 0.72 |

Figure 2:
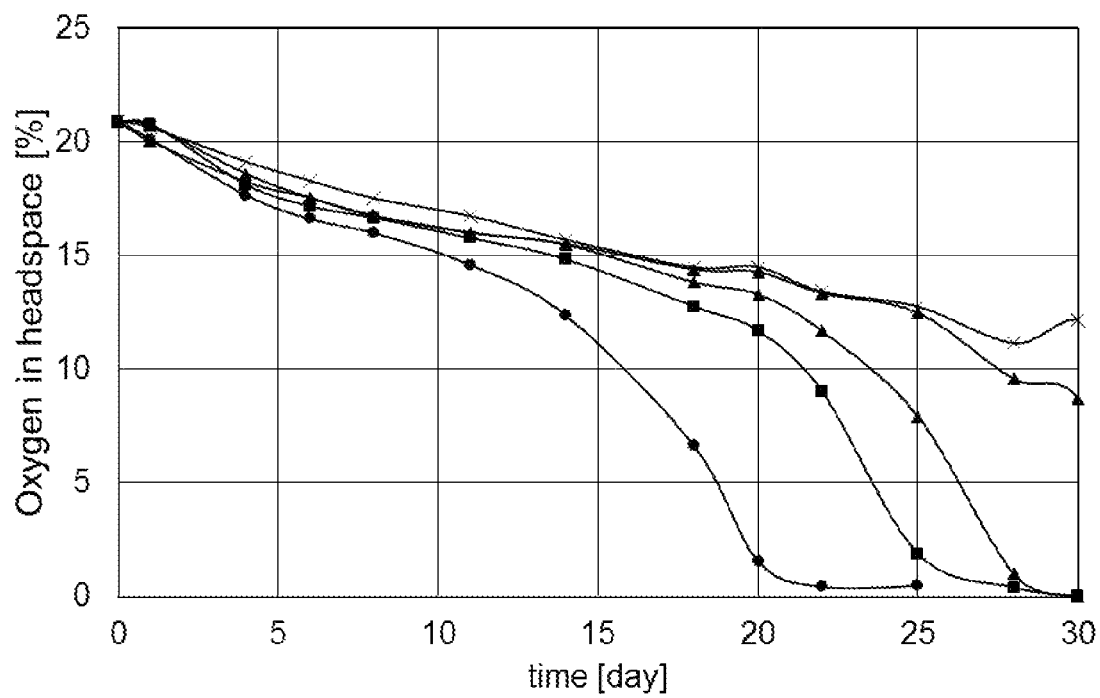
FIG. 2: Oxygen concentration in headspace during storage trial of mayonnaises at 50° C., from example 2; legend:
●: mayonnaise #25 (acetic acid solution)
■: mayonnaise #24 (apple cider vinegar 1 at 0.5%)
♦: mayonnaise #23 (apple cider vinegar 1 at 1%)
▲: mayonnaise #22 (apple cider vinegar 1 at 2%)
x: mayonnaise #21 (apple cider vinegar 1 at 3%)

These mayonnaises were prepared as in example 1. Oxygen concentration in headspace during storage trial of these mayonnaises at 50° C. was determined, to see the influence of the concentration and type of vinegar (see FIG. 2). Mayonnaise #25 (●, containing acetic acid solution only) shows the most rapid decrease of oxygen concentration in the headspace, indicating that oxidation of oil is most rapid in this mayonnaise. The mayonnaise #21 with apple cider vinegar 1 (x) at the highest concentration (3%) shows the slowest decrease of oxygen concentration. A higher concentration of apple cider vinegar leads to a slower oxidation of the vegetable oil in the mayonnaises.

The invention claimed is:

1. A method comprising:
providing a composition comprising water and vegetable oil, the vegetable oil being provided in a concentration of 5 to 85% by weight of the composition and comprising mono-unsaturated and/or poly-unsaturated fatty acids; and
adding apple cider vinegar comprising citric acid and malic acid to the composition in a concentration ranging from 0.5 to 20% by weight of the composition to reduce oxidation of the mono-unsaturated and/or poly-unsaturated fatty acids in the composition over time, wherein a weight ratio of the citric acid and the malic acid to total organic acids in the apple cider vinegar is more than 2%,
wherein the composition with the apple cider vinegar has a pH ranging from 2.5 to 5.

2. The method according to claim 1, wherein the composition with the apple cider vinegar is in the form of an oil-in-water emulsion.

3. The method according to claim 1, wherein the vegetable oil is in the form of droplets which have a surface weight mean diameter $D_{3,2}$ of less than 10 μm.

4. The method according to claim 1, wherein the composition is a mayonnaise or a salad dressing.

5. The method according to claim 1, wherein the method further comprises adding one or more organic acids other than acetic acid to the composition at a concentration ranging from 0.002 to 0.12% by weight of the composition.

6. The method according to claim 1, wherein the method further comprises adding one or more amino acids to the composition at a concentration ranging from 0.0005 to 0.05% by weight of the composition.

7. The method according to claim 1, wherein the method further comprises adding one or more phenolic compounds at a concentration ranging from 0.0005 to 0.04% by weight expressed as gallic acid equivalents.

8. The method according to claim 1, wherein the method further comprises adding ethylene-diamine-tetra-acetic acid (EDTA) in a concentration of lower than 0.007% by weight of the composition.

9. The method according to claim 1, wherein total acidity of the apple cider vinegar ranges from 2 to 20% by weight expressed as acetic acid.

10. The method according to claim 1, wherein the apple cider vinegar comprises one or more monosaccharides and/or disaccharides in a concentration ranging from 10 to 30% by weight.

11. The method according to claim 1, wherein the apple cider vinegar comprises organic acid other than acetic acid to the total organic acids in a weight ratio of 2 to 30%.

12. The method according to claim 1, wherein the apple cider vinegar comprises one or more amino acids to the total organic acids in a weight ratio of 0.5 to 10%.

13. The method according to claim 1, wherein the method further comprises adding mustard seed bran and/or guar gum.

\* \* \* \* \*